(12) United States Patent
Folsom

(10) Patent No.: US 11,475,744 B2
(45) Date of Patent: *Oct. 18, 2022

(54) SYSTEM AND METHOD ENABLING INTERACTIVE SERVICES IN ALARM SYSTEM ENVIRONMENT

(71) Applicant: The ADT Security Corporation, Boca Raton, FL (US)

(72) Inventor: Lawrence D. Folsom, Henderson, NV (US)

(73) Assignee: The ADT Security Corporation, Boca Raton, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/385,588

(22) Filed: Jul. 26, 2021

(65) Prior Publication Data

US 2021/0358279 A1    Nov. 18, 2021

Related U.S. Application Data

(63) Continuation of application No. 16/184,835, filed on Nov. 8, 2018, now Pat. No. 11,100,777.

(Continued)

(51) Int. Cl.
*G06F 15/16*    (2006.01)
*G08B 13/196*    (2006.01)
(Continued)

(52) U.S. Cl.
CPC ..... *G08B 13/19682* (2013.01); *G06F 40/134* (2020.01); *G08B 25/014* (2013.01);
(Continued)

(58) Field of Classification Search
CPC ............ G08B 13/19682; G08B 25/014; G08B 27/005; G06F 40/134; H04L 67/02; H04L 67/12

See application file for complete search history.

(56) References Cited

U.S. PATENT DOCUMENTS

2010/0099461 A1    4/2010   Rahfaldt et al.
2015/0170507 A1    6/2015   Ginter et al.
(Continued)

*Primary Examiner* — Wing F Chan
*Assistant Examiner* — Joseph R Maniwang
(74) *Attorney, Agent, or Firm* — Christopher & Weisberg, P.A.

(57) ABSTRACT

The present invention is a software as a service platform providing a system and method enabling interactive services between the end-users, emergency responders, and central monitoring stations. In an exemplary embodiment of the invention, the system provides an electronic notification of an alarm event to an end-user by way of a secure hyperlink to a web portal. The web portal provides a method enabling the end-user to interact with the central monitoring station and/or the emergency responders as well as view live and historical data from the alarm event including video. The system is configured to acquire historical video and data from the actual alarm triggering event from a variety of disparate sources including devices associated with life safety systems and lifestyle systems. The present invention, by enabling interactive services between the end-users, emergency responders, and central monitoring stations, provides better information and a better understanding of the alarm triggering event thereby informing decision making processes of the end-users, emergency responders, and central monitoring stations.

20 Claims, 5 Drawing Sheets

Related U.S. Application Data

(60) Provisional application No. 62/583,433, filed on Nov. 8, 2017.

(51) Int. Cl.
    *H04L 67/02*     (2022.01)
    *H04L 67/12*     (2022.01)
    *G08B 25/01*     (2006.01)
    *G08B 27/00*     (2006.01)
    *G06F 40/134*     (2020.01)

(52) U.S. Cl.
    CPC ............ *G08B 27/005* (2013.01); *H04L 67/02* (2013.01); *H04L 67/12* (2013.01)

(56) References Cited

U.S. PATENT DOCUMENTS

| | | |
|---|---|---|
| 2017/0186293 A1 | 6/2017 | Rabb |
| 2017/0310651 A1 | 10/2017 | Dice et al. |
| 2018/0330597 A1 | 11/2018 | Burke et al. |

I-VIEW NOW  POLICE ALARM PORTAL  Las Vegas – 58° – Rain Showers

Location
3611 Bayshore BLVD, Las Vegas, NV 69805
Primary Contact
Larry Folsom  Cell: 836-999-33333
  Other: 444-222-333

Responsible Parties
Linda R.  Cell: 777-444-3333
Ted Nugget  Cell: 443-699-777

Location Map

Video Player

Image A

Image B

Image C

Image D

Alarm History

ALARM: Front Door: 8:15AM PST
ALARM: Family Room Motion: 8:16AM PST
ALARM: Kitchen Motion Detector: 8:17AM PS Image E
Image F
Image G Larry Folsom: Viewed Video: 8:20AM PST
Larry Folsom: Called monitoring station: 8:18 AM PST
Operator: Cancelled Dispatch: 8:17AM PST

Fig. 5

SYSTEM AND METHOD ENABLING INTERACTIVE SERVICES IN ALARM SYSTEM ENVIRONMENT

CROSS-REFERENCE TO RELATED PATENT APPLICATIONS

This application is a continuation of and claims priority to U.S. Utility patent application Ser. No. 16/184,835, filed on Nov. 8, 2018, entitled SYSTEM AND METHOD ENABLING INTERACTIVE SERVICES IN ALARM SYSTEM ENVIRONMENT, which claims priority to U.S. Provisional Patent Application Ser. No. 62/583,433, filed Nov. 8, 2017, the entireties of both which are incorporated herein by reference.

BACKGROUND OF THE INVENTION

1. Field of the Invention

The present invention relates generally to alarm systems and central monitoring services and more particularly to a centrally hosted software as a service (SaaS) platform enabling interactive services between end-users, emergency responders, and central monitoring stations.

2. Description of Related Art

Homes and businesses equipped with alarm systems and video surveillance are commonplace. Typically, the alarm system comprises a variety of sensors and camera units in communication with a control panel within the location. In most instances, the alarm system control panel communicates over a network with a central monitoring station providing monitoring services of the location for the end-user. In the event of a security breach, a signal from the alarm event is received at the central monitoring station and the operator reports the alarm event to the end-user and in some instances emergency responders.

The recipient at the central monitoring station only knows when the signal from the alarm event is received. This limited information is insufficient for the end-user, the monitoring center, or emergency responder to make informed decisions. Oftentimes, the end-user does not respond timely to an outbound monitoring agent call in response to an alarm event. As a result of the limited interaction between the central monitoring station operator and the end-user, false alarms are often reported thereby needlessly draining the limited resources of emergency responders.

Over 98% of police dispatches are false alarms when using traditional monitoring because limited information is available to the monitoring agent and emergency responders. Emergency responders assign unverified alarm events non-critical status or a lower priority. A need therefore exists for a platform enabling interactive services between the end-users, emergency responders, and central monitoring stations that allow two-way communication with the end result being a better understanding of the alarm triggering event—better information enables better decisions.

SUMMARY OF THE INVENTION

The present invention overcomes these and other deficiencies of the prior art by providing a system and method including a SaaS platform that enables interactive services between the end-users, emergency responders, and central monitoring station. In an exemplary embodiment of the invention, the system provides an electronic notification of an alarm event to an end-user by way of a secure hyperlink to a web portal. The web portal provides a method enabling the end-user to interact with the central monitoring station and/or the emergency responders as well as view live and historical data from the alarm event including video. The system is configured to acquire historical video from the actual alarm triggering event, i.e., from the security breach of a door, window, or the like. In an alternative embodiment, a web portal is provided securely to an emergency responder.

The foregoing, and other features and advantages of the invention, will be apparent from the following more particular description of the preferred embodiments of the invention, the accompanying drawings, and the claims.

BRIEF DESCRIPTION OF THE DRAWINGS

For a more complete understanding of the present invention, and the advantage thereof, reference is made to the ensuing descriptions taken in connection with the accompanying drawings briefly described as follows:

FIG. 5 depicts a non-limiting example of the emergency responder interface of the web portal according to an embodiment of the invention.

DETAILED DESCRIPTION OF EMBODIMENTS

Further features and advantages of the invention, as well as the structure and operation of various embodiments of the invention, are described in detail below with reference to the accompanying FIGS. 1-5.

Definitions

In some embodiments, as used herein, "alarm signaling" or "alarm signal" refers to a signal sent from a security system. The signal may be sent via dial up, GSM, or IP. The signals are sent in industry formats, such as Contact ID, DC-09, SIA, and the like. The expansion and addition of devices used in or as security systems has resulted in devices that do not necessarily use the industry standard language and formats. These non-traditional signals are to be included in the definition of alarm signaling. The present invention is configured to receive these disparate signal types and translate them into the languages alarm monitoring station software platforms need to process the signals as with a traditional security system.

In some embodiments, as used herein, "alarm monitoring center" refers to a central monitoring center where the signals from security systems are sent and processed. The term central monitoring station may be used interchangeably with alarm monitoring center. The alarm monitoring center includes the operator responsible for processing security system signals.

In some embodiments, as used herein, "web portal" refers to a web based portal accessible to the end-user, central monitoring station, and in some instances emergency responders for engaging in the services of the present invention as described herein. The web portal may also be used programmatically with Application Programming Interfaces (APIs).

In some embodiments, as used herein, "lifestyle systems" refers to and include the home automation capabilities now available as security system add-ons. These interactive capabilities provide control over lights, locks, thermostats, and cameras via the security system. These features may be accessed by the end-user by way of electronic notifications, such as text message, or by way of a smart phone software application.

In some embodiments, as used herein, "life safety signal system" refers to an electronic system that is designed to prevent theft or intrusion and protect property and life. Security alarm systems, access control systems, fire alarm systems, and video surveillance systems are all non-limiting examples of life safety signal systems.

In some embodiments, as used herein, "disparate platform signaling" refers to the process of receiving signals from different security systems and devices each having an important process but not necessarily meant to share the signaling information beyond the realm of the end-user. The present invention includes a system configured to receive the signals from each of these disparate platform signaling systems including interactive services systems such as lifestyle and life safety systems.

Interactive Communication

Figure 1:
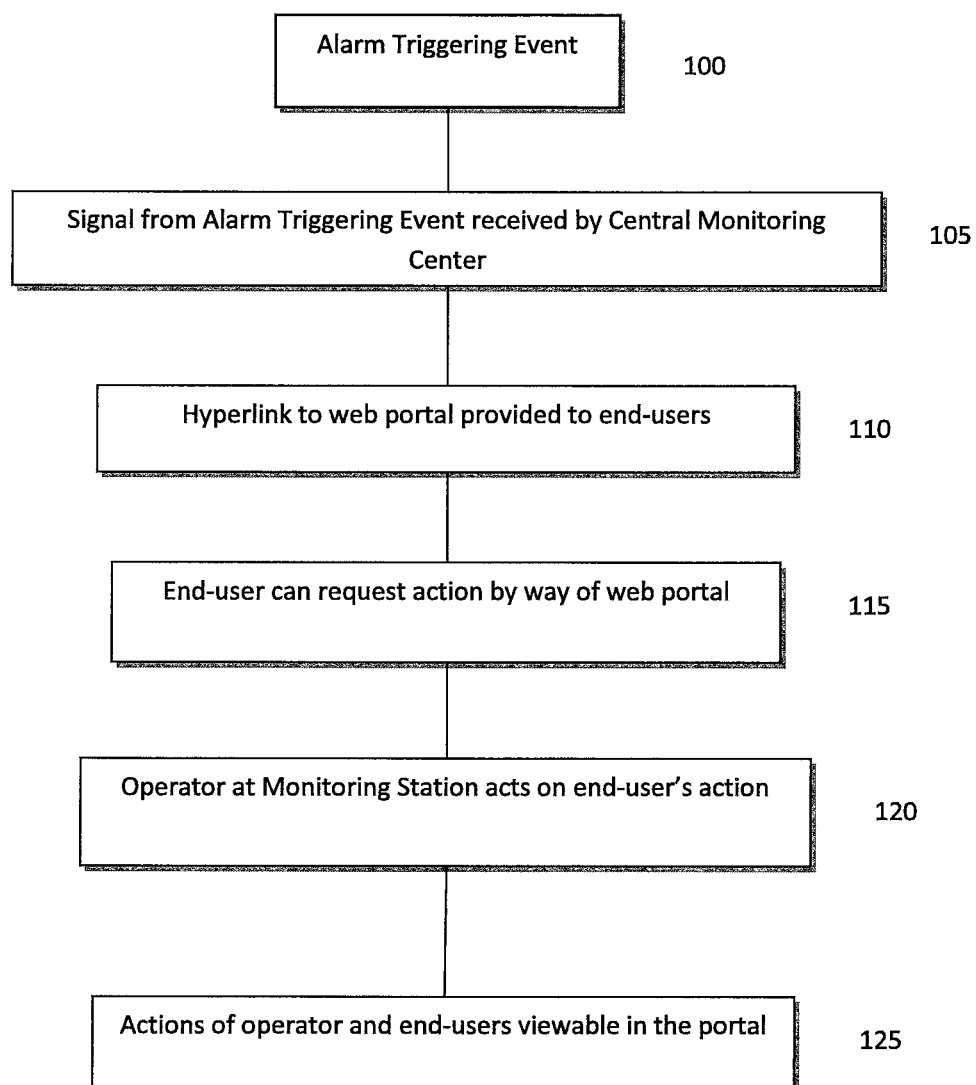
FIG. 1 illustrates a process flow of the platform used by end-users, emergency responders, and central monitoring station operators for interactive communication according to an embodiment of the invention.

FIG. 1 illustrates a process flow of the platform used by end-users, emergency responders, and central monitoring station operators for interactive communication according to an embodiment of the invention. At 100, an alarm triggering event occurs as a result of a security breach. The alarm triggering event is captured by a life safety system, which by way of non-limiting examples includes a variety of sensors including door, window, motion, and/or glass break. It is to be understood that the alarm triggering event may also be captured by add-on devices forming part of a lifestyle system. At 105, an alarm signal from the alarm triggering event is transmitted by the life safety system to a central monitoring station and to the system of the present invention. In some embodiments, the service providing the devices of the life safety system and/or lifestyle system also receives the alarm signal. The central monitoring station operator initiates pre-determined protocols.

At 110, the system of the present invention sends an electronic notification to the end-user, which may include any method of message transport including, but not limited to, email, text message, electronic messenger services, social media accounts, software application, and the like. The electronic notification includes a hyperlink to a unique Uniform Resource Locator (URL). If more than one end-user is associated with the account of the life safety system, the system may be configured to include all end-users to receive the electronic notification. The URL is unique in that it is specific to each end-user of the system. As a result, access to the system of the present invention is limited only to those end-users previously identified as permitted users. In addition, the unique URL specific to each end-user enables the system of the present invention to know which end-user opened the hyperlink to the unique URL. In an alternative embodiment, a unique pin code may be associated with each permitted end-user to ensure only that particular end-user is capable of opening the hyperlink.

Figure 2:
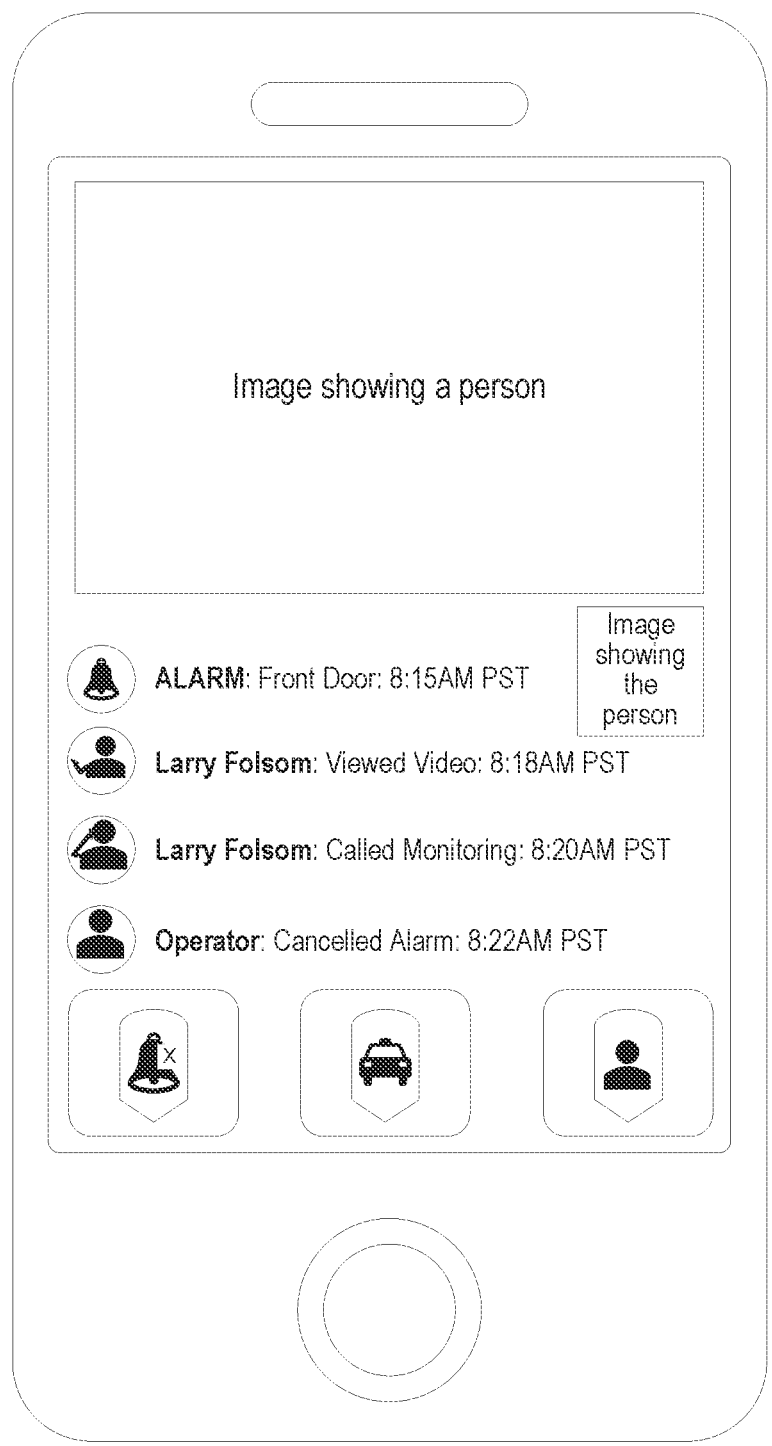
FIG. 2 depicts a non-limiting example of the end-user interface of the web portal according to an embodiment of the invention.

The URL specifies the location of a web portal of the system of the present invention. At 115, the end-user, by opening the hyperlink, is directed to the web portal and may request responsive action to the alarm signal by way of the web portal. For example, the end-user may request the alarm be cancelled, an emergency responder be dispatched to the location, and/or may call and speak to the operator directly. A non-limiting, exemplary embodiment of the end-user web portal is depicted in FIG. 2. Because the system of the present invention is a centrally hosted SaaS platform, the end-user is not required to maintain a software application on their mobile and/or computing devices—a connection to the internet is all that is required.

The end-user's experience via the web portal of the system includes the complete history of the alarm triggering event. The history viewable by the end-user depicts the actions taken by the central monitoring station operator, the actions taken by other permitted end-users, and the details of the alarm triggering event such as timing, location, zone, etc. The history viewable by the end-user also informs whether permitted end-users or responsible parties are found within or nearby the location of the alarm triggering event. For example, lifestyle systems or life safety systems may be configured to identify whether permitted end-users are within the location using methods known to those of skill in the art including without limitation geofencing. The end-user may also be provided live video or event-based video clips of the protected location including video from the actual moment a sensor was breached resulting in the alarm signal generation.

The central monitoring station operator takes action as directed by the end-user and interacts with the system of the present invention by way of a version of the web portal integrated with the central monitoring station platform. Each action taken by the operator is therefore visible to the end-users and dispatched emergency responders.

Because of the urgency associated with alarm signals, in the event the end-user does not open the hyperlink and/or is non-responsive, the central monitoring station operator would proceed pursuant to pre-determined protocols. Any action taken by the operator is logged as part of the history of the particular alarm triggering event ultimately reviewable by the end-user at a later time.

It is to be understood by those of ordinary skill in the art that the system of the present invention is not limited to alarm signals but may be associated with notifications relevant to lifestyle systems and life safety systems such as health diagnostics of devices, and the like.

Disparate Platform Signaling

When an alarm signal is transmitted and received by a central monitoring station, the operator only knows the time at which the alarm signal was received. The operator has limited, if any, information regarding the actual sensor responsible for creating the alarm signal or the time associated with the sensor being breached. For example, if a front door to a location is breached, there is typically a pre-determined delay period within which a pin code may be entered into a control panel to disable the life safety system. If the pin code is not entered or entered incorrectly, an alarm signal is generated and transmitted to the central monitoring station. As a result of the pre-determined delay period, there is a time gap between the breach and transmission of the alarm signal.

Figure 3:
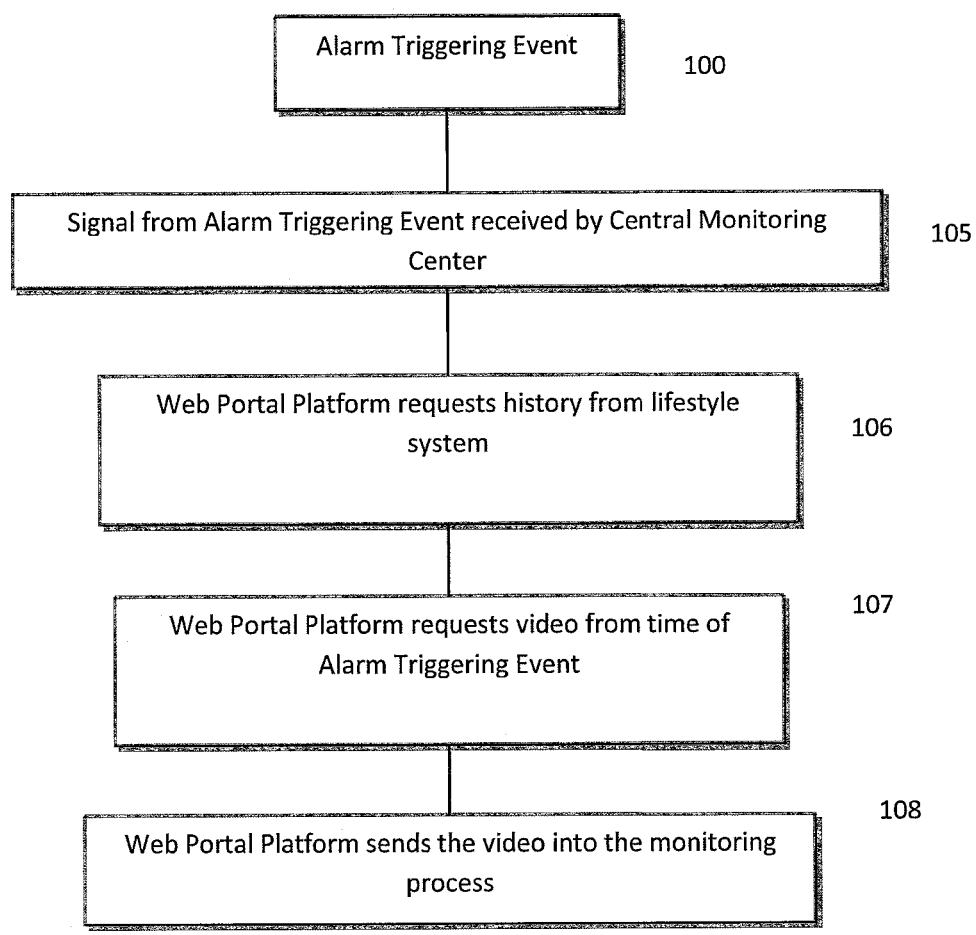
FIG. 3 illustrates a process flow of the platform for retrieving historical data associated with an alarm signal according to an embodiment of the invention.

The system of the present invention overcomes this deficiency as illustrated in FIG. 3. As illustrated in FIG. 1, the alarm signal is transmitted to the central monitoring station and to the system of the present invention at 100, 105. In FIG. 3, the system of the present invention at 106 requests the history of the alarm triggering event from the life safety and/or lifestyle system. Associated with the history of the alarm triggering event is timing data of the breach resulting in the alarm triggering event. At 107, the system of the present invention, armed with the time of the event, requests images and/or video from the area of the breach resulting in the alarm triggering event. Once the images and/or video is retrieved from a device of the life safety and/or lifestyle system, at 108, the process as illustrated in FIG. 1, 110-125 proceeds accordingly and as described herein above.

The system of the present invention is agnostic to and compatible with all life safety and lifestyle systems and the devices associated with each. The system of the present invention is configured to receive the disparate signal types of life safety and lifestyle systems and the devices associated with these systems and translate them into the languages central monitoring station software platforms need to process the signals as with a traditional security system.

Emergency Responder Portal

Figure 4:
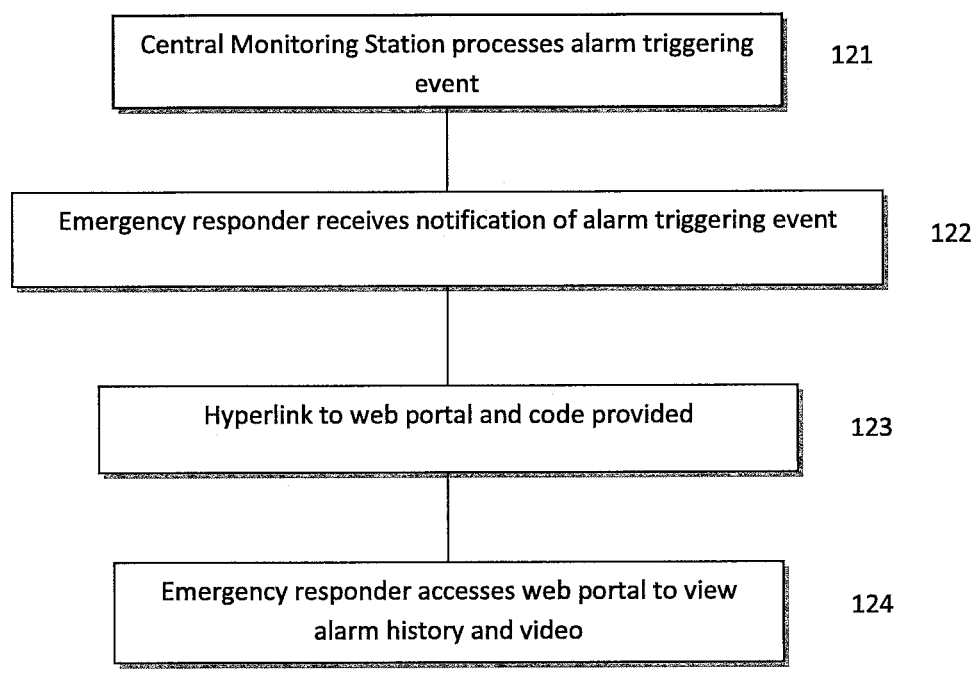
FIG. 4 illustrates a process flow of the platform used by emergency responders for interactive communication according to an embodiment of the invention.

As illustrated in FIG. 1 at 120, the operator of the central monitoring station acts on the end-user's action. The operator action may include dispatch of emergency responders to the location of the alarm triggering event as illustrated in FIG. 4 at 121. At 122, the system of the present invention sends an electronic notification to an emergency responder, which may include any method of message transport including, but not limited to, email, text message, or to proprietary software platforms run on in-vehicle mobile data terminals of emergency vehicles. As a non-limiting example, the system of the present invention sends a link into the Computer Aided Dispatch program via the Automated Secure Alarm Protocol to Public Safety Answering Point process. At 123, the electronic notification includes a hyperlink to a unique URL and requires the entry of a code set to expire after a pre-determined time interval. The code may be provided by separate notification or may be assigned previously to the emergency response team, vehicle, and/or mobile data terminal. At 124, the emergency responder accessing the web portal via the URL may interact with the operator at the central monitoring station and/or the end-user associated with the location of the alarm signal. By way of the web portal, the emergency responder may view location/map information, contact information associated with the location, alarm history, and/or live video clips as discussed herein and as depicted in the non-limiting exemplary interface of FIG. 5.

The URL and code associated with the emergency responder portal is subject to expiration after a pre-determined time interval. The time interval may be between 15 minutes and 4 hours, 30 minutes and 3 hours, 1 hour and 2 hours, but is preferably 1 hour or less.

The system and method of the present invention is a SaaS platform providing better information to end-users, monitoring centers, and emergency responders so that better decisions can be made in response to an alarm event. The system and method of the present invention, in response to an alarm event, connects with other data sources at the location of the alarm event to pull additional data necessary to provide better information to the end-users, monitoring centers, and emergency responders. The present invention is agnostic to the type of hardware in use at the alarm event location. The hardware may be included as part of a life safety system, a lifestyle system, or a device forming part of an Internet of Things network. The additional data captured in response to an alarm event is evaluated in real-time to determine whether the alarm event is verified. All available data captured by the present invention from the location of the alarm event is analyzed to provide a score associated with the priority of the alarm event.

As a non-limiting example, an alarm event may be triggered by a breach of a front door of a residence. An alarm signal is generated causing the system and method of the present invention to pull data from available sources at the residence. These sources include hardware devices associated with a life safety system, a lifestyle system, or an IoT/Do-It-Yourself platform. By way of example, the system and method of the present invention may pull video data from a video source located at the front door of the residence. Additionally, the system and method may determine whether the resident is at home via a source located at the residence using geofencing technology. In this example, the universe of data pulled by the system and method of the present invention includes a confirmed breach of the front door, video from the time of the breach of the front door, and information that the resident is not home at the time of the breach. This collection of information is provided to the end-users, monitoring centers, and ultimately emergency responders to inform decision making processes. With respect to the end-user, a decision can be made to cancel the alarm, request dispatch, or converse directly with the monitoring agent. With respect to the emergency responders, decisions can be made to elevate the priority or make informed decisions related to the falsity or accuracy of the alarm event. Ultimately, end-users, monitoring centers, and emergency responders are provided better information informing their decisions.

In an alternative embodiment of the present invention, lifestyle systems as described herein may be closed systems. For example, an end-user may equip their residence with sensors and surveillance equipment not connected to a monitoring service. The closed system is therefore limited to monitoring by way of the end-user's smartphone, laptop, tablet, and/or computer. The system of the present invention may be configured to create accounts with a central monitoring station of the end-user's choosing. Because the present system is agnostic to life safety and lifestyle systems, the account may be built, managed, and monitored as described herein.

In another alternative embodiment, the system of the present invention may provide information relevant to an on demand request. For example, an insurance adjuster may request video from a particular day, time, and location relevant to an incident. Typically, such information may be difficult to come by because the data is overwritten or destroyed. The present system overcomes this deficiency by requesting historical data relevant to the on demand request and as described herein.

Those of skill in the art will appreciate that the various illustrative logical blocks, module, units, and steps described in connection with the embodiments disclosed herein can often be implemented as electronic hardware, computer software, or combinations of both. To clearly illustrate this interchangeability of hardware and software, various illustrative components, blocks, modules, and steps have been described above generally in terms of their functionality. Whether such functionality is implemented as hardware or software depends on the particular constraints imposed on the overall system. Skilled persons can implement the described functionality in varying ways for each particular system, but such implementation decisions should not be interpreted as causing a departure from the scope of the invention. In addition, the grouping of functions within a unit, module, block, or step is for ease of description. Specific functions or steps can be moved from one unit, module, block, or step without departing from the invention.

The above description of the disclosed embodiments, and that provided in the accompanying documents, is provided to enable any person skilled in the art to make or use the invention. Various modifications to these embodiments will be readily apparent to those skilled in the art, and the generic principles described herein, and in the accompanying documents, can be applied to other embodiments without departing from the spirit or scope of the invention. Thus, it is to be understood that the description and drawing presented herein, and presented in the accompanying documents, represent particular aspects and embodiments of the invention and are therefore representative examples of the subject matter that is broadly contemplated by the present invention. It is further understood that the scope of the present invention fully encompasses other embodiments that are, or may become, obvious to those skilled in the art and that the scope of the present invention is accordingly not limited by the descriptions presented herein, or by the descriptions presented in the accompanying documents.

The invention claimed is:

1. A method for enabling interaction between an end-user, central monitoring station operator, and emergency responders by providing access to a web portal over a network, method comprising:
   receiving over a network an alarm signal from an alarm triggering event, the alarm triggering event being associated with a location;
   determining whether additional data sources are available at the location of the alarm triggering event, the available additional data sources having additional data;
   upon determining additional data sources are available, capturing over the network the additional data from the additional data sources;
   determining a score associated with a priority of the alarm triggering event based at least in part on the captured additional data;
   providing a universe of captured data from the location of the alarm triggering event to an end-user and central monitoring station, the universe of captured data including at least the determined score and a video associated with the alarm triggering event and at least an action taken by a permitted end-user; and
   providing an electronic notification to the end-user, the electronic notification enabling the end-user to request a responsive action by way of the web portal, the responsive action including at least a request to speak directly to an operator, the action taken by the permitted end-user being viewable on the portal and including whether the permitted end-user has viewed the video associated with the alarm triggering event.

2. The method of claim 1, wherein the alarm signal is transmitted by a life safety system.

3. The method of claim 1, wherein the alarm signal is transmitted by a lifestyle system.

4. The method of claim 2, wherein the life safety system includes at least one selected from the group consisting of security alarm systems, access control systems, fire alarm systems, and video surveillance systems.

5. The method of claim 3, wherein the lifestyle system includes at least one selected from the group consisting of home automation capabilities providing control over lights, locks, thermostats, and cameras.

6. The method of claim 1, wherein the alarm signal can be received from disparate systems over a network.

7. The method of claim 1, wherein the additional data sources are not responsible for creating the alarm signal associated with the alarm triggering event.

8. The method of claim 1, wherein the additional data sources include at least one of geofencing data sources and hardware devices associated with a life safety system, a lifestyle system, a stand-alone device, and a device forming part of an Internet of Things network.

9. The method of claim 1, wherein the universe of captured data is selected from at least one of the group consisting of a history of the alarm triggering event, a location, a time stamp of the alarm signal, geofencing data from geofencing data sources, actions taken by the central monitoring station, from the additional data sources at the alarm triggering event location, the geofencing data including whether permitted end-users are within a pre-defined range from the location of the alarm triggering event.

10. The method of claim 1, wherein the method further includes:
   receiving an on-demand request for information relevant the alarm triggering event, the on-demand request being received from anyone other than the end-user, the operator, and the emergency responders; and
   providing the information relevant to the alarm triggering event, the information including video from a specified at least one of a day, a time, and a location relevant to the alarm triggering event.

11. The method of claim 1, wherein the method further includes:
   receiving an end-user request to provide the responsive action;
   receiving an operator action associated with the responsive action;
   providing the electronic notification to at least one emergency responder from the emergency responders, the electronic notification enabling the emergency responder to request an access to the web portal to view at least any one of an alarm history and video associated with the alarm triggering event; and
   receiving a first responder action.

12. The method of claim 11, wherein any one of the operator action and the first responder action are viewable on the web portal.

13. The method of claim 1, wherein the responsive action includes at least one of a request that an alarm associated with the alarm signal be cancelled and a request an emergency responder be dispatched.

14. The method of claim 1, wherein the notification includes a hyperlink to a unique Uniform Resource Locator, the Uniform Resource Locator specifying a location of the web portal, the hyperlink requiring an entry of a code set to expire after a pre-determined time interval.

15. The method of claim 14, wherein the hyperlink is provided to a Computer Aided Dispatch program via an Automated Secure Alarm Protocol to Public Safety Answering Point process.

16. A system including:
   a hardware-based web portal platform associated with at least one of a life safety system and a lifestyle system for enabling interaction between an end-user, central monitoring station operator, and emergency responders, the hardware-based web portal platform configured to:

receive over a network an alarm signal from an alarm triggering event, the alarm triggering event being associated with a location;

determine whether additional data sources are available at the location of the alarm triggering event, the available additional data sources having additional data;

upon determining additional data sources are available, capturing over the network the additional data from the additional data sources;

determine a score associated with a priority of the alarm triggering event based at least in part on the captured additional data;

provide a universe of captured data from the location of the alarm triggering event to an end-user and central monitoring station, the universe of captured data including at least the determined score and a video associated with the alarm triggering event and at least an action taken by a permitted end-user; and provide an electronic notification to the end-user, the electronic notification enabling the end-user to request a responsive action by way of the web portal, the responsive action including at least a request to speak directly to an operator, the action taken by the permitted end-user being viewable on the portal and including whether the permitted end-user has viewed the video associated with the alarm triggering event.

17. The system of claim 16, wherein the hardware-based web portal platform is further configured to:

receive an on-demand request for information relevant the alarm triggering event, the on-demand request being received from anyone other than the end-user, the operator, and the emergency responders;

provide the information relevant to the alarm triggering event, the information including video from a specified at least one of a day, a time, and a location relevant to the alarm triggering event.

18. The system of claim 16, wherein the hardware-based web portal platform is further configured to:

receive an end-user request to provide the responsive action;

receive an operator action associated with the responsive action;

provide the electronic notification to at least one emergency responder from the emergency responders, the electronic notification enabling the emergency responder to request an access to the web portal to view at least any one of an alarm history and video associated with the alarm triggering event; and receive a first responder action.

19. The system of claim 18, wherein any one of the operator action and the first responder action are viewable on the web portal.

20. The system of claim 16, wherein the responsive action includes at least one of a request that an alarm associated with the alarm signal be cancelled and a request an emergency responder be dispatched.

* * * * *